Aug. 24, 1948.  J. H. HOERN  2,447,858

VALVE SEAT ASSEMBLY

Filed Oct. 31, 1945

INVENTOR.
JOSEPH H. HOERN
BY
McDonald and Fragno
ATTORNEYS

Patented Aug. 24, 1948

2,447,858

UNITED STATES PATENT OFFICE 2,447,858

VALVE SEAT ASSEMBLY

Joseph H. Hoern, Birmingham, Mich., assignor to Eaton Manufacturing Company, Cleveland, Ohio, a corporation of Ohio Application October 31, 1945, Serial No. 625,847

4 Claims. (Cl. 123—188)

This invention relates to valves for internal combustion and more particularly to valve seat inserts therefor.

Broadly the invention comprehends a valve seat insert comprising a pair of interlocked annular members of different coefficients of expansion and wear, corrosion, and erosion resisting qualities, one member constituting the seat proper for the valve and the other member the seat holding or locking means.

An object of the invention is the provision of a valve seat insert for engine blocks that is resistant to wear and corrosion and which will remain secured in the block regardless of temperature variations in the engine.

Another object of the invention is the provision of a valve seat insert for internal combustion engines that can sustain severe temperatures without working loose from its installation in the engine.

Another object of the invention is the provision of a valve seat insert for internal combustion engines comprising a corrosion and wear resistant part interlocked with a part adapted to secure the first part in the engine and restrain it from movement therefrom during the operation of the engine and its associated valve.

A further object of the invention is the provision of a valve seat insert for internal combustion engines having means incorporated therein allowing for temperature expansion of the valve seat insert while at the same time preventing loosening of the insert from the engine.

Other objects and advantages of the invention will appear from the following description taken in connection with the drawing, forming a part of the specification; and in which.

Figure 1:
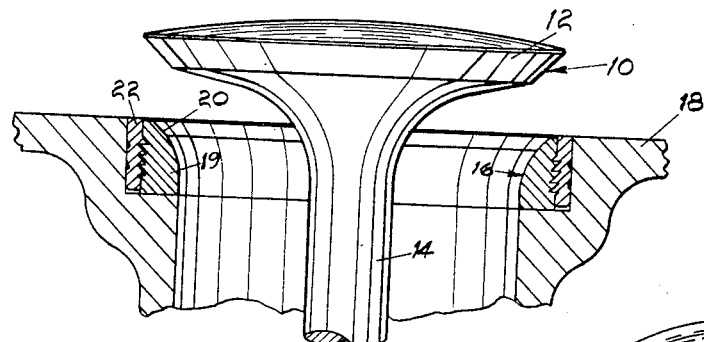
Fig. 1 is a fragmentary, vertical, sectional view of a valve seat insert in relation to its associated engine block and valve.

It has become vitally necessary in the development of high compression internal combustion engines to provide the valve mechanism thereof with valve seats that are capable of resisting wear, corrosion, and erosion and at the same time providing effective sealing during all temperature operations of the engine. As a means of providing valve seats of this nature, it has become necessary to manufacture valve seats adapted to be inserted in the engine block of a metallic composition different than the engine block so as to possess wear, corrosion, and erosion resisting qualities. Along with the provision of suitable valve seat inserts, it becomes very important to provide means for suitably securing and retaining the inserts in the engine block for all operating conditions of its associated engines. A present invention makes provision of a valve seat insert that possesses all the necessary qualities of an efficient, effective valve seat insert that is capable of withstanding high temperature engine operating conditions without working loose from its position in the engine block.

The valve seat insert herein devised comprises a seat proper that is an annular member of corrosion, erosion, and wear resisting properties having annular external ribs adapted to be embraced by a split ring, of a metallic composition possessing a coefficient of expansion similar to the engine block, having corresponding ribs with the ribs on the internal annular seat member such that when the external split ring is pressed into a recess in the cylinder block especially provided therefor in which it is assembled, it is securely held therein and radial clearance is provided between the inner annular seat member and split ring so as to permit of radial expansion of the inner annular seat member without interfering with the split ring. With the freedom of radial expansion permitted for the inner seat member, no tendency of disrupting the split rings holding qualities within the cylinder occurs thus providing for effective and efficient operation of the valve seat insert during the operation of its associated engine.

Referring to the drawings for more specific details of the invention, 10 represents generally a valve having a head 12 and stem 14, said head adapted to seat upon a valve seat insert 16 secured in an engine cylinder block 18.

The valve seat insert 16 comprises an annular internal member 19 constituting the seat proper and providing an annular valve seating surface 20 upon which the valve 10 is adapted to seat when in normally closed position and a split ring 22 adapted to embrace the member 19. The member 19 and ring 22 each have a plurality of annular mating or interlocking ribs 24 and 26 respectively such that upon assembly of the member and ring they are secured to one another and permit solely of radial movement relative to one another when the member 19 and ring 22 are installed in the operating position in the cylinder block as shown by Fig. 1.

Figure 2:
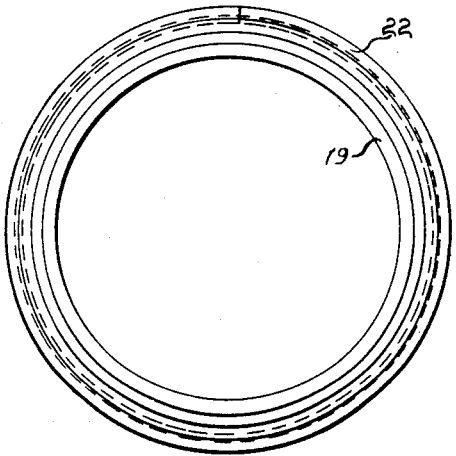
Fig. 2 is a top plan view of the valve seat insert shown by Fig. 1.
Figure 3:
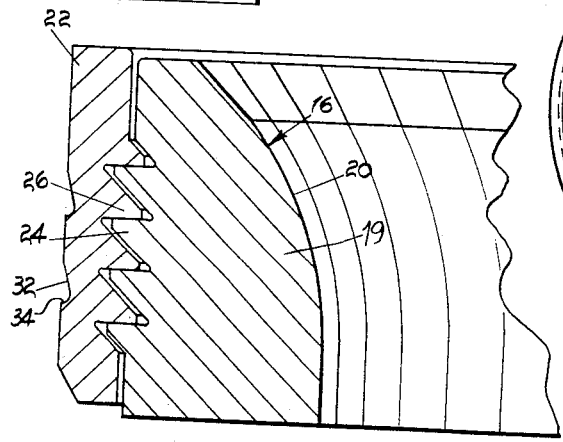
Fig. 3 is an enlarged sectional view of the valve seat insert shown by Fig. 1 emphasizing the radial clearance provided between the parts of the valve seat insert.
Figure 4:
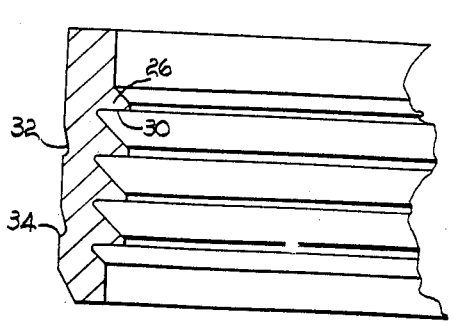
Fig. 4 is a fragmentary vertical sectional view of the outer ring of the insert.
Figure 5:
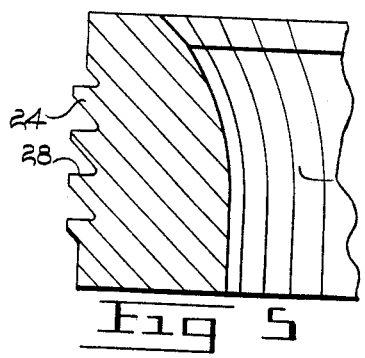
Fig. 5 is a fragmentary vertical sectional view of the inner ring or valve seat member proper of the valve seat insert.

Fig. 2 illustrates in exaggerated form the allowable radial clearance provided between the member 19 and ring 22 while at the same time representing clearly the arrangement of corresponding ribs 24 and 26 respectively on the member and ring wherein the ribs have corresponding parallel surfaces 28 and 30 arranged transversely to the axis of the valves. The ring 22 is provided additionally with a plurality of grooves 32 in the external periphery thereof adapted to have an edge 34 such that upon installation of the ring in the block the edge acts as a one way clutch to bite into the block and thus inhibit the ring and associated inner member from working loose from the block. It is to be noted with reference to Fig. 1 that in the installation of member 19 and ring 22 in the cylinder block that the member 19 extends axially beyond the base of the ring 22 so that the member may be firmly secured in the cylinder block from any movement in the direction of its axis even under operating conditions.

Under operating conditions wherein the valve seat insert is subjected to the high operating temperatures generated in the engine cylinder, the valve seat proper, that is member 19 being of a coefficient of expansion commensurate with its metallic composition and characteristics will expand uniformly within ring 22 and thus adjust itself to the valve 10 and thereby prevent leakage past the valve seat inasmuch as it rectifies any possible misalignment that might occur through one portion of the valve seat being heated to a higher expansion temperature than another portion thereof. Furthermore, the ring 22 will not be disturbed from its position in the block 18 which inasmuch as it possesses a coefficient of expansion similar to the block and is only slightly heated as compared to the seat proper, effectively remains secured in the block.

Although the vavle seat insert is shown as employing a specific type of interlocking rib construction between member 19 and ring 22, it is to be realized that any suitable corresponding rib arrangement between the member 19 and ring 22 effective to function as does the design herein shown and described will suffice for the purpose; and accordingly, the showing made is not to be taken as a limitation of structure.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In combination with an internal combustion engine having one or more valve ports in the cylinder block thereof, a valve seat insert for each of said ports comprising a ring having a plurality of external annular ribs and a split ring assembled in interlocking relation with the other ring having a plurality of internal ribs corresponding to the ribs on the other ring and a plurality of circumferential locking grooves, said split ring being received by a recess in the cylinder block in press fit relationship and held therein by the action of the grooves cooperating therewith against the annular wall of the recess.

2. In combination with an internal combustion engine having one or more valve ports in the cylinder block thereof and valves adapted to close said ports, a valve seat insert for each of said ports comprising an annular valve seating member of corrosion, erosion, and wear resistant material and a split ring of a material having a coefficient of expansion similar to the cylinder block interlocked externally upon the annular member, said ring being press fitted in the opening of the valve port and incorporating means therein for associated locking relation with the wall of the valve ports for restraining axial movement therefrom.

3. In combination with an internal combustion engine having one or more valve ports in the cylinder block thereof, a valve seat insert for each of said ports comprising a ring having a plurality of external annular ribs and a split ring assembled in interlocking relation with the other ring having a plurality of ribs corresponding to the ribs on the other ring and means on the external surface thereof for associated locking relation with the recess wall in the cylinder block, said split ring being received by a recess in the cylinder block in press fit relationship, and the ribs on the respective rings each having surfaces lying in a plane perpendicular to the axis of the rings bearing upon one another restricting axial movement between the rings while at the same time permitting radial expansion or contraction between the rings without disrupting the retaining effect of the split ring in the cylinder block.

4. In combination with an internal combustion engine having one or more valve ports in the cylinder block thereof, a valve seat insert for each of said ports comprising a pair of rings having cooperative means therebetween for securing the rings together, one radially disposed upon the other, said means including a plurality of ribs on the rings, each having a surface perpendicular to the axis of the rings and a surface angularly disposed to the axis of the rings, said perpendicular surface on the ribs of the respective rings having bearing relation with one another whereas the angular surfaces are normally spaced apart from one another thus providing for radial expansion or contraction of the rings relative to one another but restricting axial movement therebetween and said external ring having means in the outer peripheral surface thereof for locking engagement with the cylinder block when assembled in press fit relationship therein.

JOSEPH H. HOERN.

REFERENCES CITED

The following references are of record in the file of this patent:

UNITED STATES PATENTS

| Number | Name | Date |
| --- | --- | --- |
| 1,756,337 | Bowler | Apr. 29, 1930 |
| 2,017,154 | Larkin | Oct. 15, 1935 |
| 2,056,160 | Allen | Oct. 6, 1936 |
| 2,112,232 | Stoll | Mar. 29, 1938 |
| 2,165,311 | Stancliff | July 11, 1939 |